No. 746,076. PATENTED DEC. 8, 1903.
F. A. HEADSON.
PIPE CUTTING TOOL.
APPLICATION FILED FEB. 21, 1903.
NO MODEL. 3 SHEETS—SHEET 1.

Witnesses:

Inventor:
Frank A. Headson,
By Thomas F. Sheridan,
Att'y.

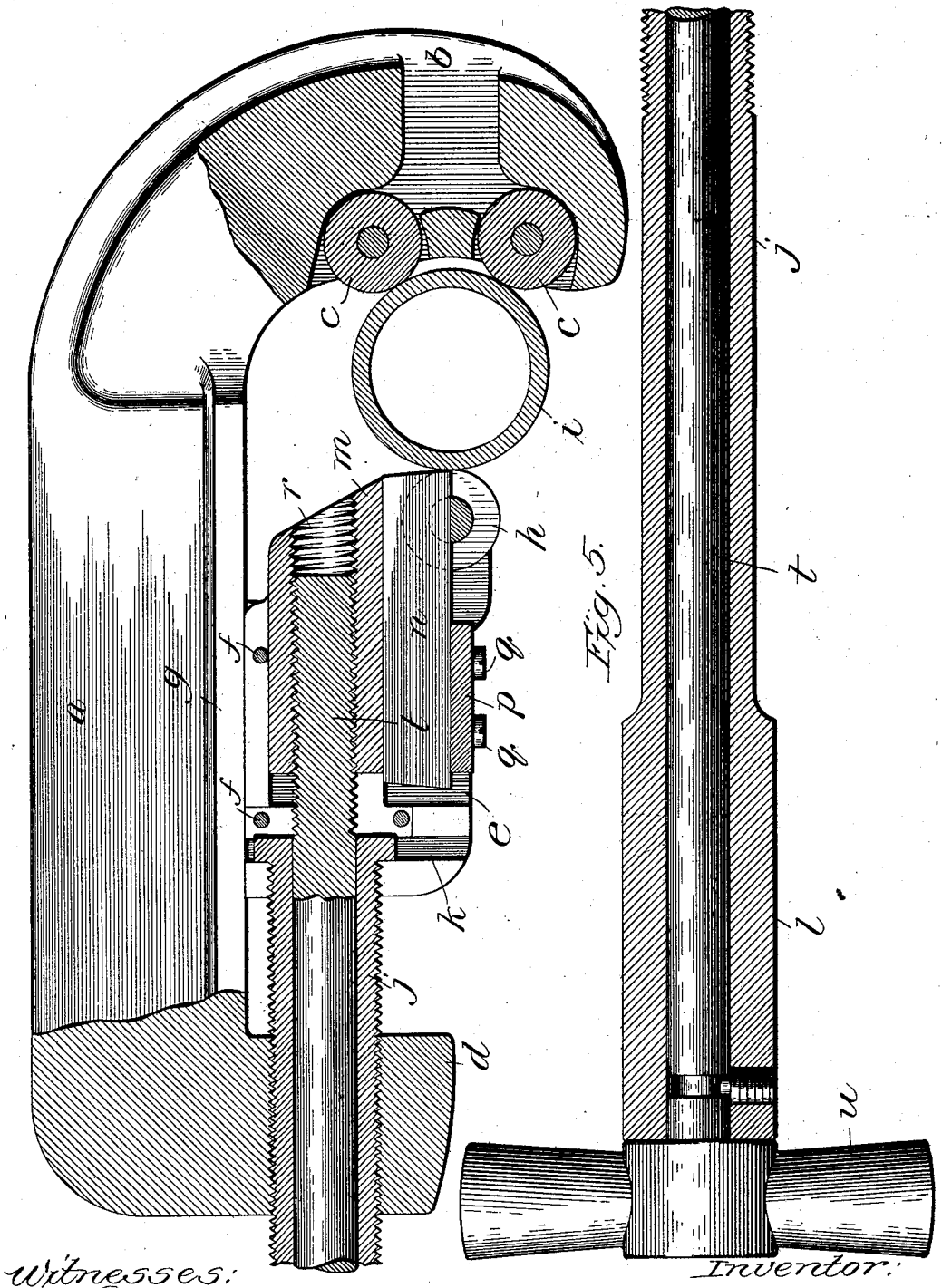

No. 746,076. PATENTED DEC. 8, 1903.
F. A. HEADSON.
PIPE CUTTING TOOL.
APPLICATION FILED FEB. 21, 1903.
NO MODEL. 3 SHEETS—SHEET 3.
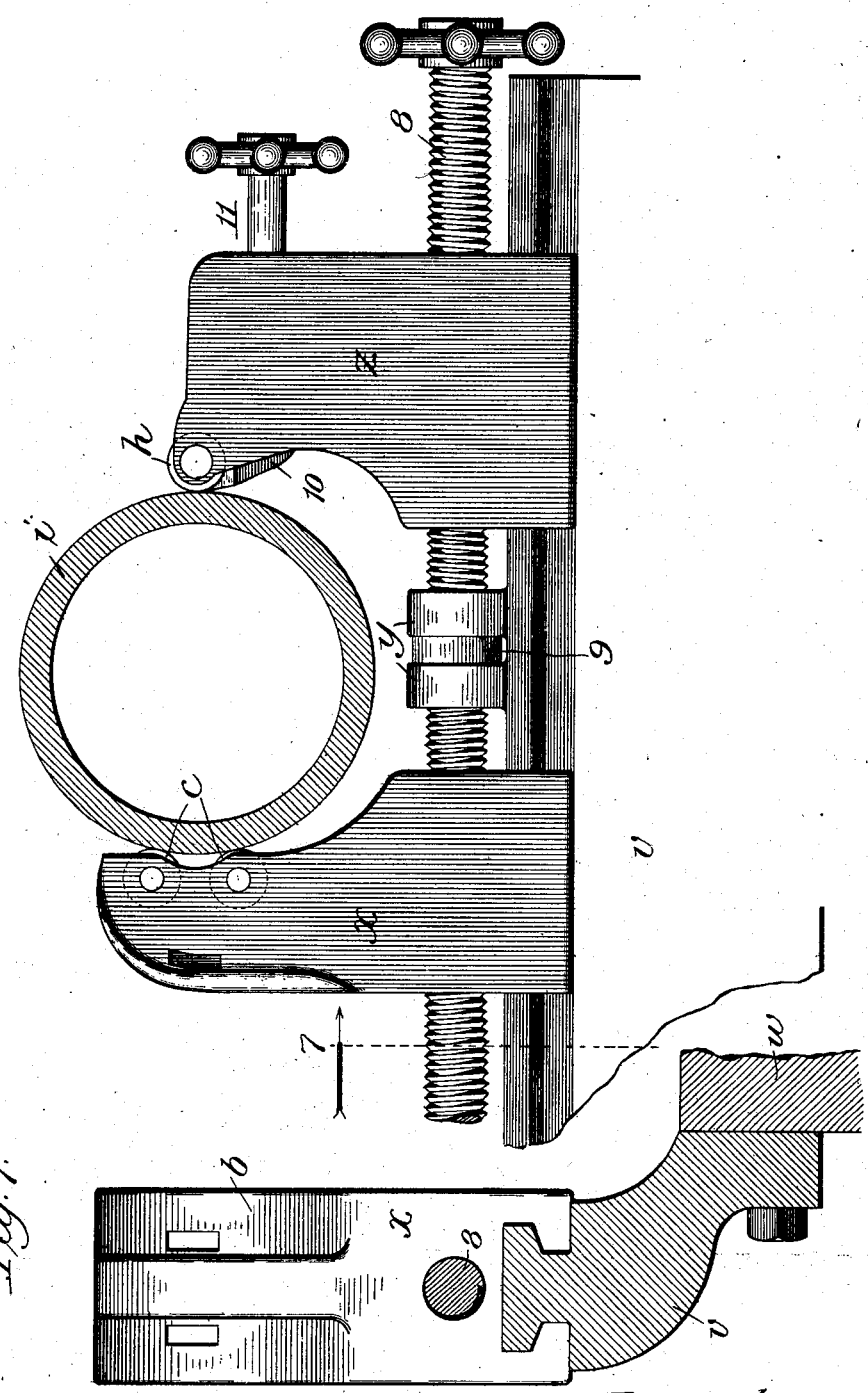
Witnesses:
Inventor:
Frank A. Headson,
By Thomas F. Sheridan,
Att'y No. 746,076. Patented December 8, 1903.

UNITED STATES PATENT OFFICE.

FRANK A. HEADSON, OF LAFAYETTE, INDIANA, ASSIGNOR OF TWO-THIRDS TO LEO POTTLITZER, HERMAN POTTLITZER, JULIUS POTTLITZER, AND MAX POTTLITZER, OF LAFAYETTE, INDIANA.

PIPE-CUTTING TOOL.

SPECIFICATION forming part of Letters Patent No. 746,076, dated December 8, 1903.

Application filed February 21, 1903. Serial No. 144,483. (No model.)

*To all whom it may concern:*

Be it known that I, FRANK A. HEADSON, a citizen of the United States, residing at Lafayette, in the county of Tippecanoe and State of Indiana, have invented certain new and useful Improvements in Pipe-Cutting Tools, of which the following is a specification.

The invention relates particularly to that class of tools which is adapted to be used either by hand alone or in connection with machine-tools for the purpose of cutting water, steam, and gas pipes, and particularly to the arrangement of the parts by which the pipe is held firmly in position during the cutting operation, all of which will more fully hereinafter appear.

The principal object of the invention is to provide a simple, economical, and efficient pipe-cutting tool.

A further object of the invention is to provide a pipe-cutting tool with antifriction mechanism for holding the pipe while the cutting-tool is being operated.

Further objects of the invention will appear from an examination of the drawings and the following description and claims.

The invention consists, further and finally, in the features, combinations, and details of construction hereinafter described and claimed.

Figure 1:
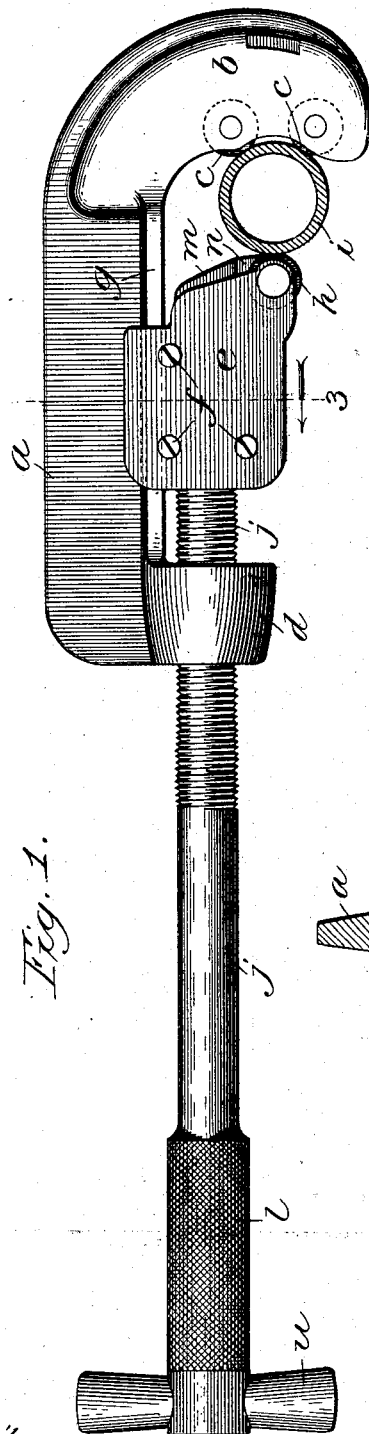
Figure 3:
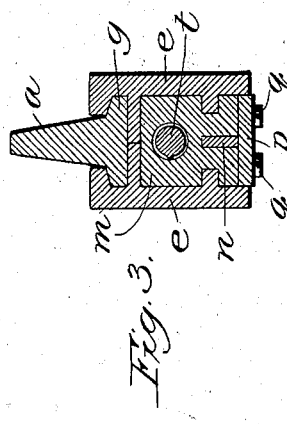
Figure 2:
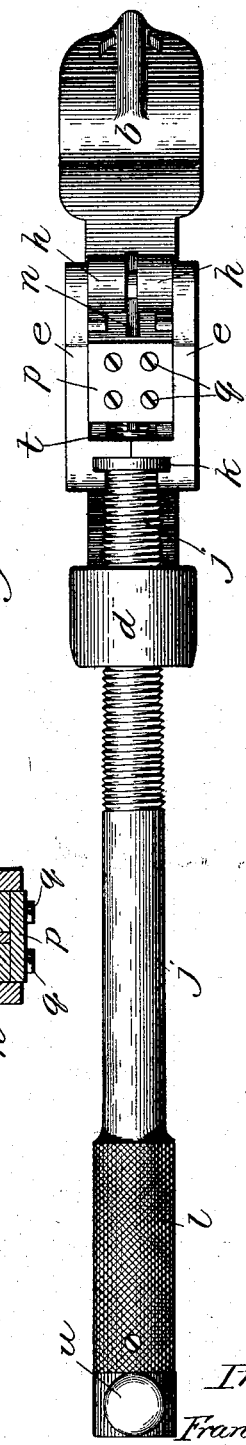

In the accompanying drawings, Figure 1 is a side elevation of a portable pipe-cutting tool made in accordance with these improvements; Fig. 2, a plan view of the same looking at it from above; Fig. 3, a cross-sectional view taken on line 3 of Fig. 1 looking in the direction of the arrow; Fig. 4, an enlarged elevation, partly in section, of one end of the pipe-cutting tool shown in Figs. 1 and 2, with the parts arranged in cutting position; Fig. 5, an enlarged sectional view of the handle end of the pipe-cutting tool; Fig. 6, an elevation showing these improvements when attached to a machine-tool, and Fig. 7 an end elevation of the same looking at the parts from the left-hand side of Fig. 6.

In constructing a pipe-cutting tool in accordance with these improvements I make a main-frame portion $a$, provided with an upwardly-extending jaw $b$ at its front end, the inner surface of which is curved, as shown particularly in Figs. 1 and 4. The inner curved surface of the jaw of this main-frame portion is provided with a set of antifriction-rolls $c$, the purpose of which will be more fully hereinafter set forth. The rear end of the main-frame portion is provided with an upwardly-extending lug $d$, having a threaded bore therein, the purpose of which will also more fully hereinafter appear.

To rotatably hold the pipe in position, so that it may be cut without bending either of the ends, and thus avoid forming an objectionable bur, a longitudinally-divided second-frame portion $e$ is provided. This frame portion is made in two parts, as above suggested, held together by means of rivets or screws $f$, and at its lower end is slidably mounted upon a "way" on the main-frame portion. The front end of the second-frame portion is provided with a grooved antifriction roll or rolls $h$, which, in connection with the antifriction-rolls $c$ of the main-frame portion, rotatably holds the pipe $i$ in position to be cut. To move this second frame into and out of position, a hollow adjusting-screw $j$ is provided, the shouldered front end of which rotatably engages a slot or groove $k$ in the second-frame portion and the threaded surface of which engages with the threaded bore in the lug $d$. The outer end of this adjusting-screw is provided with an integral knurled handle $l$, by which it may be turned in one direction or the other to move the second-frame portion with its antifriction-rolls into and out of position.

To cut the pipe in such a way as will not disturb the antifriction holding mechanism, and thereby minimize the possibility of the forming of an objectionable bur, a tool-holding block $m$ is provided and slidably mounted in the second-frame portion. This tool-holding block is provided with a cutting-tool $n$, clamped in position by means of a strap $p$ and screws $q$. This tool-holding block is further provided with a threaded perforation $r$, engaging with the threaded portion of a feed-screw $t$, which feed-screw is passed through the hollow adjusting-screw, as shown particularly in Fig. 4. The outer end of this feed-screw is provided with a handle $u$, by which it may be turned independently of the adjusting-screw, and thus impart an independent sliding motion to the tool-holding block, with its cutter, so as to move the same into or out of cutting position without disturbing in any way either or both of the frame portions.

In Figs. 6 and 7 I have shown a modification of these ideas as applied to a machine-tool in which the pipe $i$ may be grasped and held in a retaining-chuck. In this modification the main-frame portion is made in two parts, a part $v$, which is attached to the bed of the machine $w$, and the upwardly-extending jaw $x$, slidably mounted thereon. The main-frame portion is further provided with an integral lug $y$. The second-frame portion $z$ is in this instance slidably mounted upon the main-frame portion, but outside of the lug, and in that way specifically different from the mechanisms illustrated in Figs. 1 to 5, inclusive. Both of these frame portions $x$ and $z$, as above stated, are slidably mounted on the main-frame portion and are provided with threaded perforations with which the adjusting-screw 8 has a threaded engagement. This adjusting-screw has a shoulder portion 9, mounted between the two-part lug $y$, which prevents longitudinal movement thereof, but during its rotation operates to move both of the frame portions, with their antifriction-rolls $c$ and $h$, into position to rotatably hold the pipe in position to be cut. The second-frame portion $z$ is provided with a tool-holding block 10, constructed and arranged therein exactly as shown and described in connection with Fig. 4. Instead, however, of having its feed-screw 11 passed through the adjusting-screw it passes through the second-frame portion and engages the tool-holding block, exactly as shown and described in connection with Fig. 4.

From the foregoing description of the construction and operation it will be seen that I have provided a machine which effectively holds the pipe rotatably in position—that is, the pipe may be rotated in the tool or the tool may be rotated around the pipe, as occasion requires or necessity demands, and the desired cut made therein without bending inwardly either cut end of the pipe, so as to form an objectionable bur, all of which will be thoroughly understood and appreciated by those skilled in the art. It will also be seen that the cutting-tool is arranged under and between the two-part antifriction-rolls $h$ and substantially opposite the rolls $c$ $c$, all of which serves to hold the pipe in an efficient manner during the cutting operations.

I claim—

1. In a pipe-cutting tool, the combination of a frame portion provided with a jaw having a plurality of bearing-points, a sliding block mounted on such frame provided with roller mechanism, a cutting-tool provided with a cutting-point mounted between the axial center of such roller mechanism and the bearing-points of the jaw, and means for moving such cutting-tool independently of the sliding block and roller mechanism, substantially as described.

2. In a pipe-cutting tool, the combination of a frame portion provided with a rigid jaw having a plurality of bearing-points, a sliding block mounted on such frame provided with a pair of rollers mounted in axial alinement with each other and movable toward and from the rigid jaw, a cutting-tool mounted between such rollers with its cutting-point intermediate their axial center and the bearing-points of the rigid jaw and movable independently of the sliding block, and means for moving such cutting-tool and sliding block independently of each other, substantially as described.

3. In a pipe-cutter of the class described, the combination of a main-frame portion provided with a pair of antifriction-rolls, a second-frame portion slidably mounted thereon and provided with a second set of antifriction-rolls to rotatably hold the pipe in position to be cut, a hollow screw for moving the second frame into and out of position, a pipe-cutter slidably mounted in the second-frame portion, and a threaded screw-rod passed through the hollow screw of the second-frame portion for moving the pipe-cutter into and out of cutting position independently of the frame, substantially as described.

4. In a pipe-cutter of the class described, the combination of a main-frame portion provided with an upwardly-extending jaw at the front end carrying a set of antifriction-rolls and with an upwardly-extending lug, a second-frame portion provided with antifriction-rolls slidably mounted upon the first main-frame portion for rotatably holding the pipe in position to be cut, a hollow adjusting-screw engaging the second-frame portion and the lug on the main-frame portion for moving such second-frame portion into and out of position, a tool-carrying block slidably mounted in the second-frame portion, and a second screw passed through the hollow screw of the second-frame portion and engaging the tool-carrying block for independently moving the same into and out of cutting position, substantially as described.

5. In a pipe-cutting tool of the class described, the combination of a main-frame portion provided with an upwardly-extending jaw at its front end bearing a set of antifriction-rolls on the inner surface thereof and with an upwardly-extending lug at its rear end provided with a threaded bore therein, a longitudinally-divided second-frame portion slidably mounted upon the main-frame portion and provided with antifriction-roll mechanism, a hollow adjusting-screw engaging with the second-frame portion and passed through the threaded opening of the lug on the main-frame portion for moving such second-frame portion into and out of position, a tool-holding block provided with a cutting-tool slidably mounted in the second-frame portion, and a feed-screw passed through the hollow adjusting-screw of the second-frame portion and having threaded engagement with the tool-holding block for moving the same independently of the second-frame portion, substantially as described.

FRANK A. HEADSON.

Witnesses:
GEO. M. FORESMAN, Jr.,
HERBERT S. FELSENTHAL.